US008325042B1

United States Patent
Hyde et al.

(10) Patent No.: US 8,325,042 B1
(45) Date of Patent: Dec. 4, 2012

(54) RFID TAGS WITH DIFFERENTIAL DEMODULATORS

(75) Inventors: John D. Hyde, Corvallis, OR (US); Ronald A. Oliver, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 517 days.

(21) Appl. No.: 12/705,036

(22) Filed: Feb. 12, 2010

Related U.S. Application Data

(60) Provisional application No. 61/152,626, filed on Feb. 13, 2009.

(51) Int. Cl.
*G08B 21/00* (2006.01)
(52) U.S. Cl. .................................. 340/572.1; 340/10.1
(58) Field of Classification Search .... 340/572.1–572.9, 340/10.1–10.42
See application file for complete search history.

(56) References Cited

U.S. PATENT DOCUMENTS 5,649,295 A * 7/1997 Shober et al. ................ 340/10.1
6,021,503 A * 2/2000 Pax et al. ..................... 713/400

* cited by examiner

*Primary Examiner* — Jeffery Hofsass
(74) *Attorney, Agent, or Firm* — Turk IP Law, LLC

(57) ABSTRACT

An Integrated Circuit (IC) for an RFID tag contains at least two demodulators, each having an RF input port configured to receive and demodulate an RF input signal, with one or more of the RF inputs being a differential signal, and with at least two of the RF input ports electrically isolated from each other. The RFID IC contains two or more envelope detectors for recovering analog modulation envelope signals from the RF signals, and one or more slicers to convert the modulation envelopes to at least one digital signal. The analog signals from the two envelope detectors may be first combined, then converted to a digital signal. Alternatively, the analog modulation envelopes may be first converted to digital signals then combined in a digital combiner. Alternatively, the analog modulation envelopes may be converted to separate digital signals without being combined.

20 Claims, 16 Drawing Sheets

*TAG WITH TWO DIFFERENTIAL DEMODULATORS*

*RFID SYSTEM*

*RFID TAG*

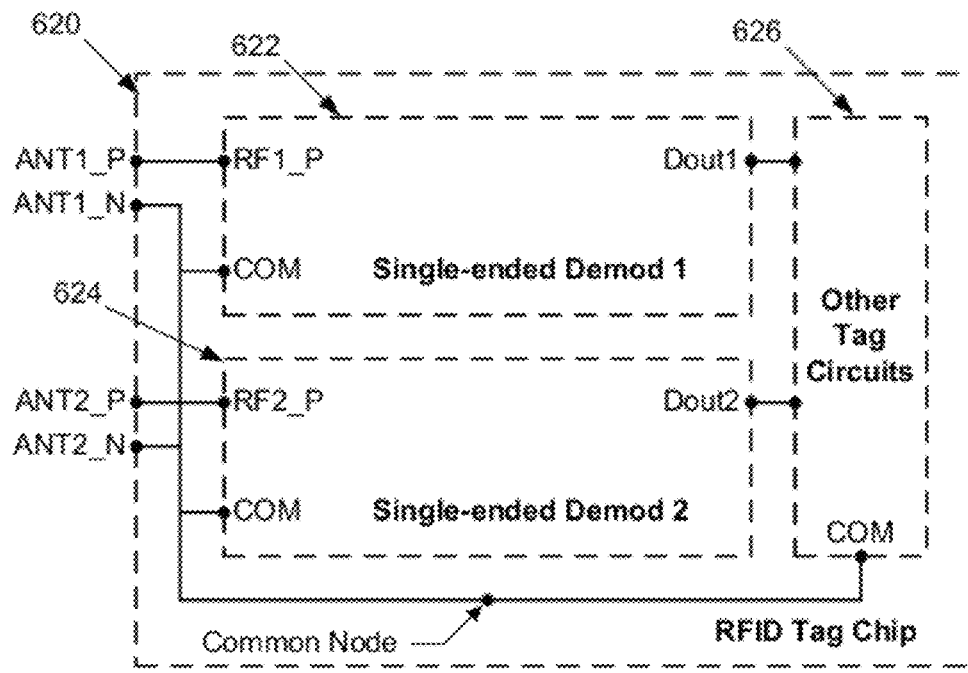
FIG. 6A  PRIOR ART  *TAG WITH TWO SINGLE-ENDED DEMODULATORS*
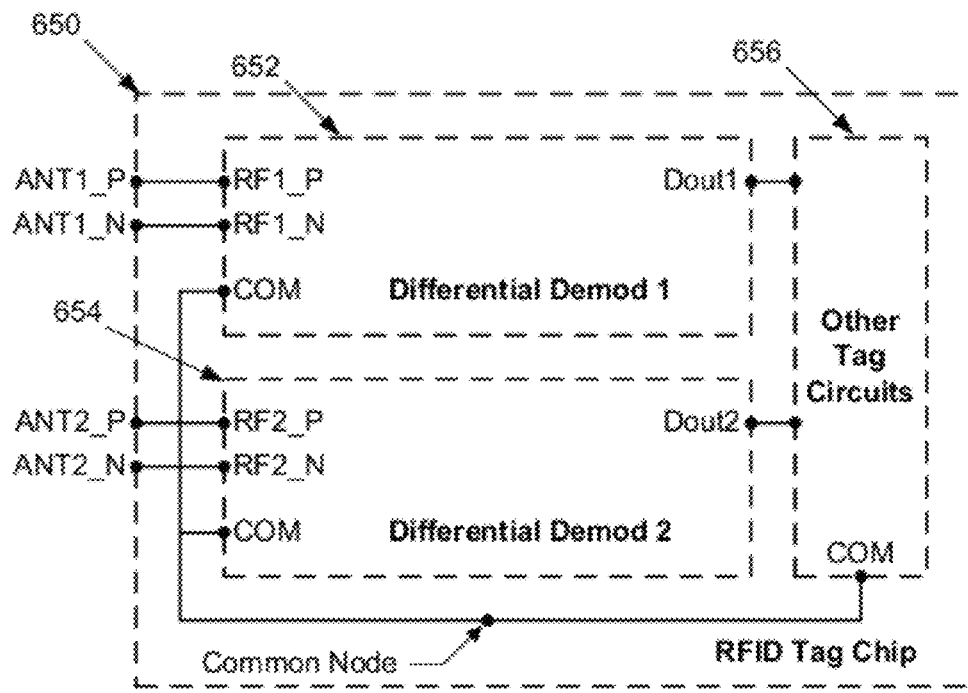
FIG. 6B  *TAG WITH TWO DIFFERENTIAL DEMODULATORS*

*DIFFERENTIAL DICKSON ENVELOPE DETECTOR*

*DIFFERENTIAL DICKSON ENVELOPE DETECTOR WITH DIFFERENTIAL OUTPUT*

*DIFFERENTIAL BRIDGE ENVELOPE DETECTOR*

*DIFFERENTIAL BRIDGE ENVELOPE DETECTOR W/ NMOS & PMOS DIODES*

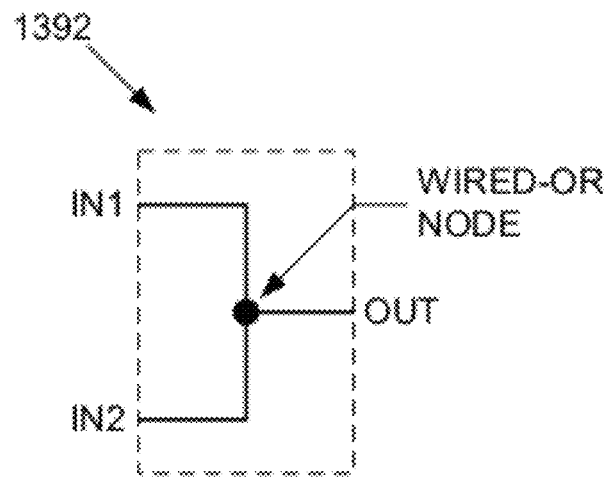
FIG. 13A  *PASSIVE CURRENT OR CHARGE MODE*
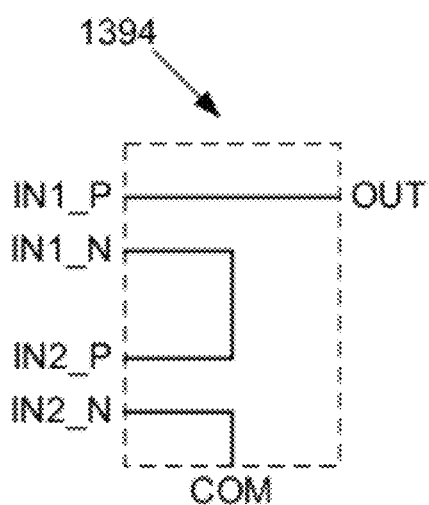
FIG. 13B  *PASSIVE VOLTAGE MODE*
*ANALOG SIGNAL COMBINERS*

ACTIVE CURRENT OR
CHARGE MODE

ACTIVE VOLTAGE
MODE

ANALOG SIGNAL COMBINERS

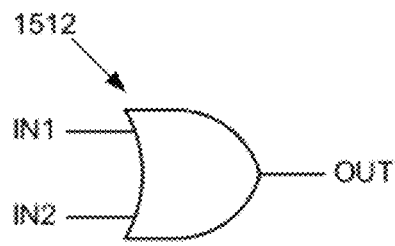
FIG. 15A   *OR GATE*
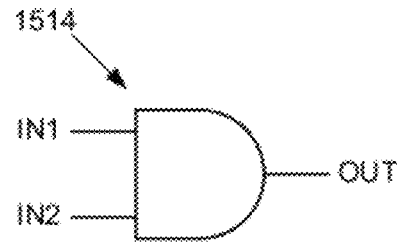
FIG. 15B   *AND GATE*
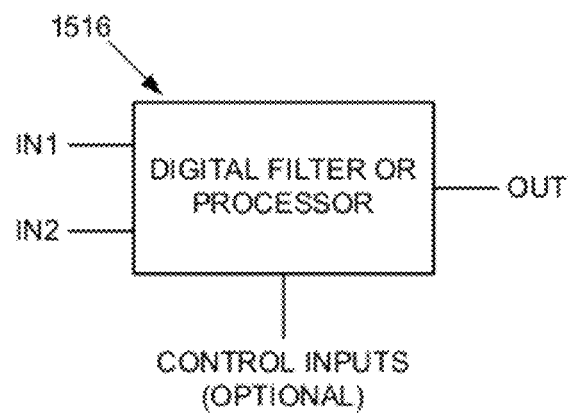
FIG. 15C   *FILTER*
*DIGITAL SIGNAL COMBINERS*

*DEMODULATOR WAVEFORMS*

RFID TAGS WITH DIFFERENTIAL DEMODULATORS

CROSS REFERENCE TO RELATED APPLICATIONS

This application claims the benefit of U.S. Provisional Patent Application Ser. No. 61/152,626 filed on Feb. 13, 2009. The disclosures of the provisional patent application are hereby incorporated by reference for all purposes.

BACKGROUND

Radio Frequency Identification (RFID) systems typically include RFID tags and RFID readers. RFID readers are also known as RFID reader/writers or RFID interrogators. RFID tags are also known as RFID transponders or identification transponders. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In some RFID tags the power management section includes an energy storage device, such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

The amount of energy that a tag can extract from an incident electromagnetic field varies with the orientation of the tag's antenna relative to the electromagnetic field. In certain orientations a passive tag may not be able to extract sufficient energy to power itself. As a result, a reader's ability to read tags within its field of view may be reduced depending on the orientation of the tag antenna relative to the reader antenna. Some tags include two antennas with different orientations or different polarizations to increase the tag's ability to extract power from the incident field; these tags are often called dual-antenna tags. In conventional dual-antenna tags the antenna ports within an integrated circuit (IC) of the tag share a reference potential at a common node. Unfortunately, as the tag dimensions become small relative to the wavelength of the electromagnetic radiation, the tag antennas couple electromagnetically and, as a consequence of the shared reference potential, act electrically like a single antenna, thereby negating the orientation-insensitivity benefits of the dual antennas.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an Integrated Circuit (IC) for an RFID tag, and an RFID tag including such an IC, where the IC contains at least two demodulators. Embodiments are directed to each of the demodulators containing an RF input port configured to receive and demodulate an RF input signal, at least one of the RF input ports being a differential RF input port. The two RF input ports are electrically isolated from each other, which in some embodiments allows two antennas connected to the isolated RF input ports to respond independently to an electromagnetic field. In some embodiments the RFID IC contains two demodulators configured to receive two differential RF input signals. Embodiments are further directed to the IC containing two or more envelope detectors configured to recover analog modulation envelope signals from the RF inputs, at least one of envelope detectors being configured to receive a differential RF input. Embodiments are further directed to one or more data slicers to convert the analog modulation envelopes to a digital signal. In some embodiments the analog modulation envelopes may be first combined and then converted to a digital signal by a single data slicer. In other embodiments the analog modulation envelopes may first be converted to digital signals by two or more data slicers and then the digital signals combined in a digital combiner. In other embodiments the analog modulation envelopes may be converted to separate digital signals by two or more data slicers without being combined.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 6A illustrates an RFID tag chip with two single-ended demodulators according to the prior art, and FIG. 6B illustrates an example RFID tag chip with two differential demodulators according to embodiments.

FIGS. 13A through 13D illustrate example implementations of analog signal combiners that may be used in a dual-differential demodulator according to embodiments.

FIGS. 15A through 15C illustrate example implementations of digital signal combiners that may be used in a dual-differential demodulator according to embodiments.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
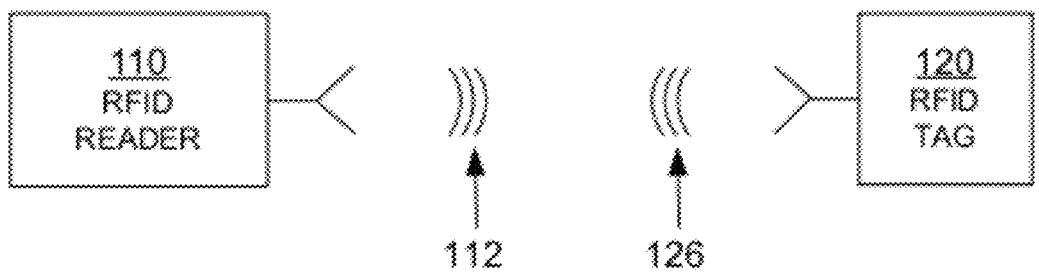
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
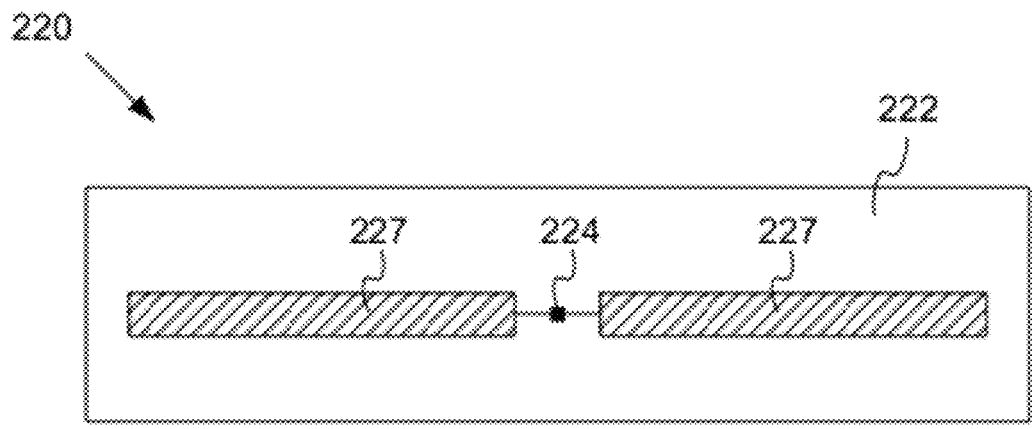
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224. IC 224, which is often called a tag IC or tag chip or RFID IC, is arranged on inlay 222.

Tag 220 also includes an antenna for exchanging wireless signals with its environment. The antenna is usually flat and attached to inlay 222. IC 224 is electrically coupled to the antenna via suitable antenna terminals (not shown in FIG. 2).

The antenna may be made in a number of ways, as discussed in more detail below. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna terminals of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
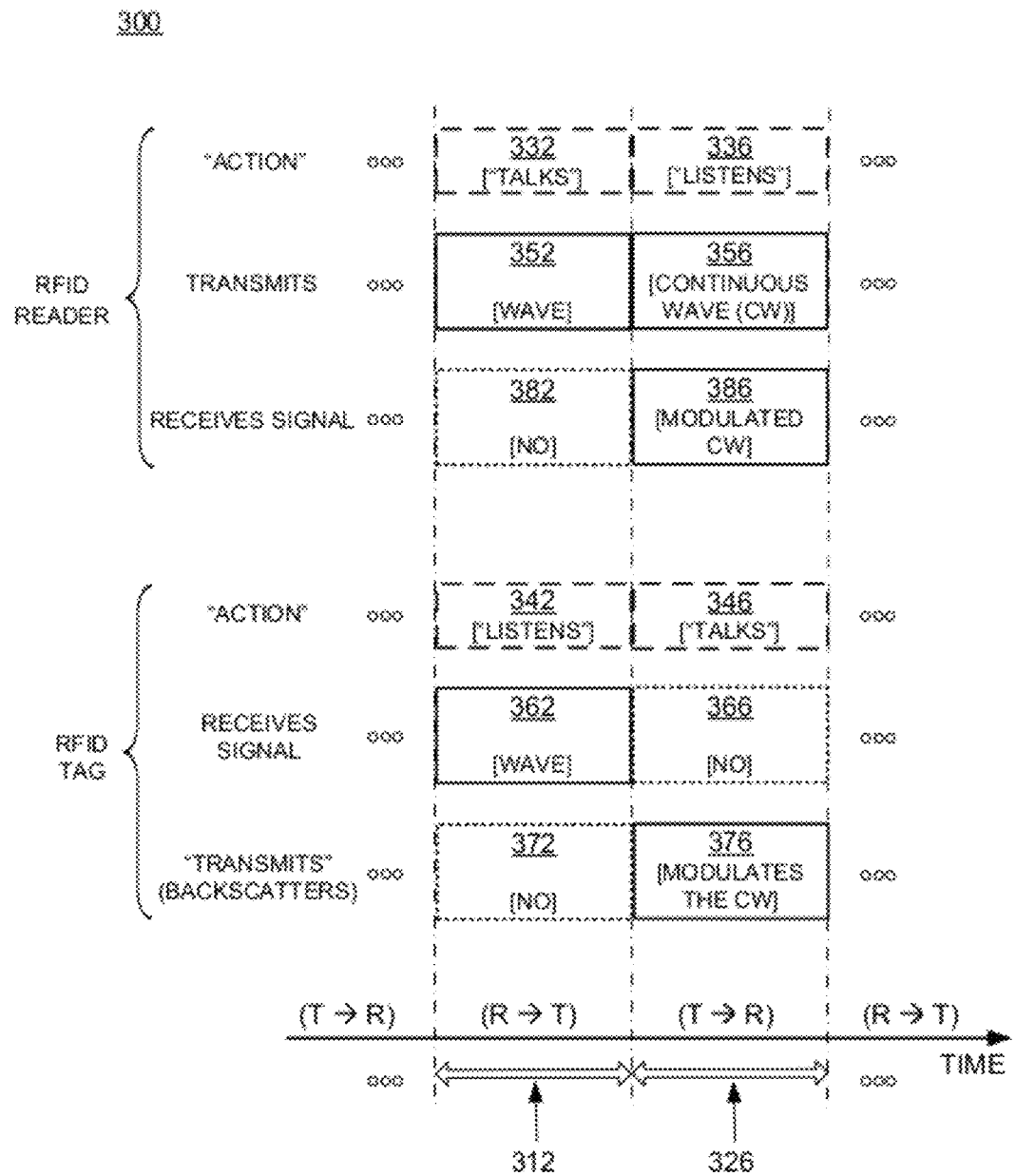
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
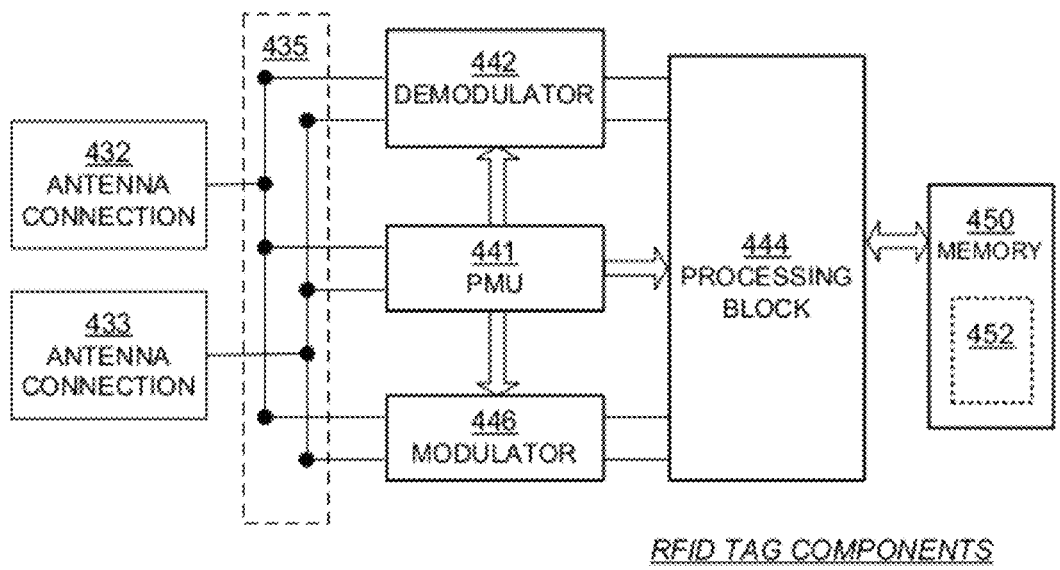
FIG. 4 is a block diagram showing a detail of an RFID tag, such as the one shown in FIG. 1.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna terminals 432, 433, which are suitable for coupling to one or more antenna segments (not shown in FIG. 4). Antenna terminals 432, 433 may be made in any suitable way, such as using pads and so on. In a number of embodiments more than two antenna terminals are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier (Rect) and PMU (Power Management Unit) 441. Rectifier and PMU 441 may be implemented in any way known in the art, for harvesting raw RF energy received via antenna terminals 432, 433. In some embodiments, block 441 may include more than one rectifier.

In operation, an RF wave received via antenna terminals 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna terminals 432, 433. Demodulator 442 may be implemented in any way known in the art, for example including an attenuator stage, an amplifier stage, and so on. In embodiments according to the present invention demodulator 442 can be implemented as one or more dual-differential demodulators.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna terminals 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

Figure 5A:
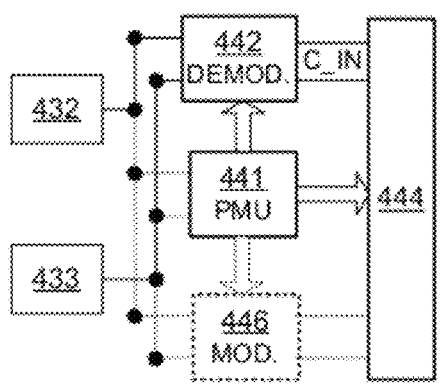
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session (receive mode of operation) during time interval 312 of FIG. 3. An RF wave is received by antenna terminals 432, 433; a signal is demodulated by demodulator 442; and the demodulated signal is input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
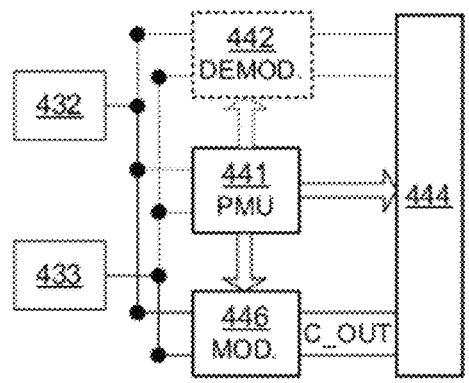

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a stream of symbols for transmission. C_OUT is then modulated by modulator 446, and output as an RF wave via antenna terminals 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

FIG. 6A and FIG. 6B illustrate example RFID tag chips 620 and 650, respectively, which can be the IC 224 of FIG. 2, with two demodulators (demod or demods). RFID tag chip 620 contains two single-ended demodulators according to prior art, in which one of the antenna inputs to each demodulator RF input port is coupled to a common node that is also connected or coupled to other tag circuits. This common node is often referred to as ground, and in an integrated circuit the common node is often connected to the semiconductor substrate. RFID tag chip 650 contains two differential demodulators according to the embodiments, in which neither of the antenna inputs to each demodulator RF input port is coupled to a common node that is also connected or coupled to other tag circuits.

Tag chip 620 includes two single-ended demodulators 622 and 624, which contain single-ended RF input ports RF1_P and RF2_P, respectively, connected to antenna terminals ANT1_P and ANT2_P. Antenna terminals (ANT1_P/ANT1_N) can be the antenna terminals 432 and 433 of FIG. 4, in which antenna terminal 432 of FIG. 4 is ANT1_P connected to RF1_P, and antenna terminal 433 of FIG. 4 is ANT1_N connected to the common node. Additional antenna segments as previously discussed may be connected to antenna terminals (ANT2_P/ANT2_N) with ANT2_P connected to RF2_P, and ANT2_N connected to the common node. Demodulators 622 and 624 provide digital output signals, at output ports DOUT1 and DOUT2, to other tag circuits 626 for further processing, such as processing block 444.

Tag chip 650 includes two differential demodulators 652 and 654, which contain differential RF input ports (RF1_P/RF1_N) and (RF2_P/RF2_N), respectively, connected to antenna terminals (ANT1_P/ANT1_N) and (ANT2_P/ANT2_N). Antenna terminals (ANT1_P/ANT1_N) can be the antenna terminals 432 and 433 of FIG. 4, in which antenna terminal 432 of FIG. 4 is ANT1_P connected to RF1_P, and antenna terminal 433 of FIG. 4 is ANT1_N connected to RF1_N. Additional antenna segments as previously discussed may be connected to antenna terminals (ANT2_P/ANT2_N) with ANT2_P connected to RF2_P, and ANT2_N connected to RF2_N. Demodulators 652 and 654 provide digital output signals, at output ports DOUT1 and DOUT2, to other tag circuits 656 for further processing, such as processing block 444.

A single-ended demodulator such as 622 or 624 is substantially responsive only to the voltage potential between its single-ended input port, such as RF1_P for demodulator 622 in FIG. 6A, and the common node. A differential demodulator such as 652 or 654 is substantially responsive only to the voltage potential between the two nodes of its differential input port, such as between input nodes RF1_P and RF1_N for demodulator 652 in FIG. 6B, and is not significantly responsive to the voltage potential between either of its two input nodes and the common node, or between either of its two input nodes and other input nodes, such as the input nodes of another demodulator.

A differential RF input port may, or may not, be electrically isolated from another differential RF input port or from a single ended RF input port. Two RF input ports are electrically isolated from each other if a balanced odd-mode RF input signal applied to one of the two ports results in substantially no odd-mode RF signal coupling to a balanced load connected to the other port, where the balanced signal and balanced load share the same reference ground node, and where the reference ground node is not directly connected to any terminal of either port, including not to the common node of a single ended port. An odd-mode signal is the voltage potential between the two terminals of a differential port, or the voltage potential between the terminal of a single ended port and the common node. A balanced RF signal has substantially equal voltage amplitudes between either of its two terminals and the reference ground, and a balanced load has substantially equal impedances between either of its two terminals and the reference ground. Two differential RF input ports may be isolated if they satisfy this condition. A differential RF input port may also be isolated from a single ended RF input port if the two ports satisfy this condition. However two single ended RF input ports cannot be electrically isolated as defined above, because they both share a common node, which allows signal current to flow asymmetrically between the two ports and asymmetrically through the load resulting in odd-mode coupling. Electrical isolation between two RF input ports of an RFID tag chip is a significant benefit for an RFID tag because the absence of significant coupling between the two ports allows two antennas, which may have different spatial orientations, connected to the electrically isolated input ports to respond independently to an electromagnetic field, each according to its specific spatial orientation. This can improve the orientation insensitivity of an RFID tag that includes two antennas that are each oriented for maximum response in different directions.

Figure 7:
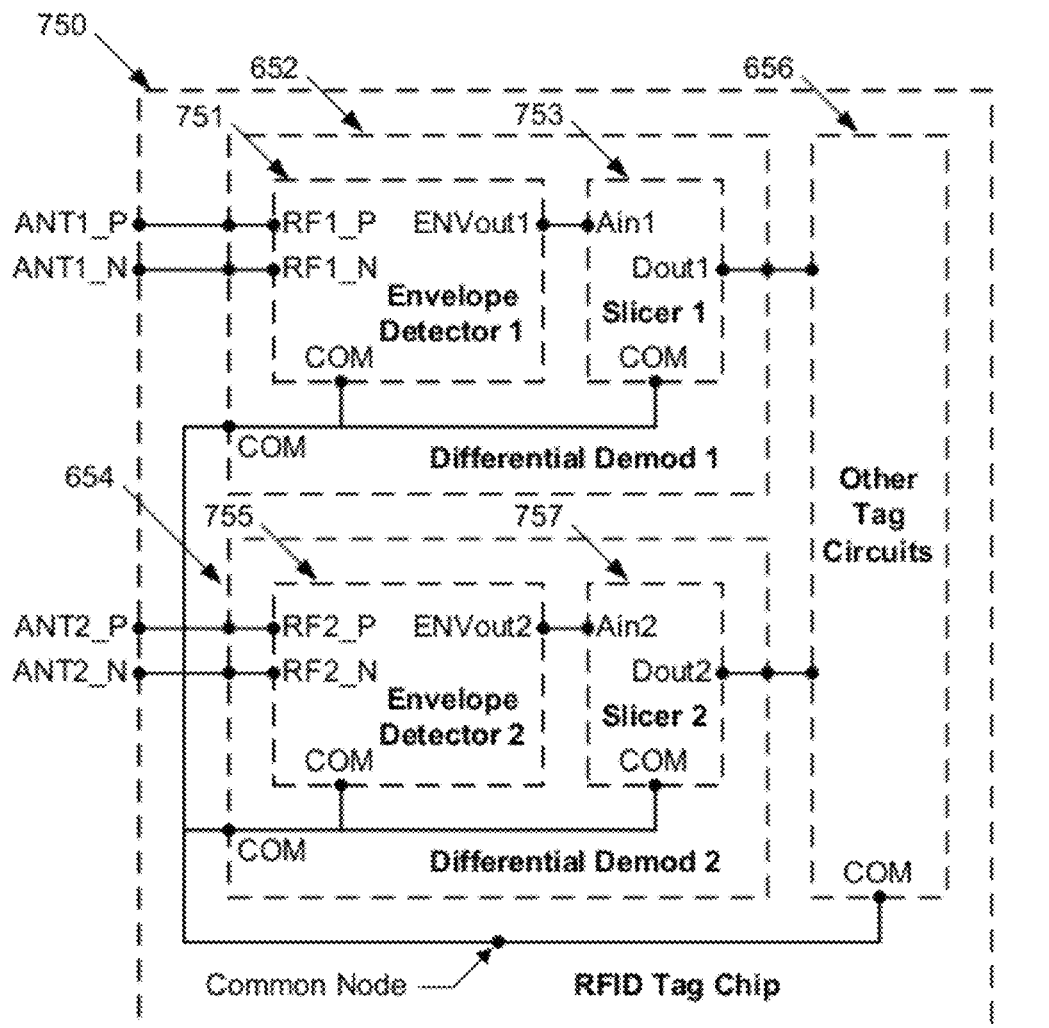
FIG. 7 illustrates the example RFID tag chip of FIG. 6B with components of the demodulators according to embodiments.

The function of the RFID tag demodulator is to recover a time varying sequence of symbols, typically digital data pulses, from a modulated RF signal at the demodulator RF input port. The demodulator accomplishes this in two stages. First an envelope detector, such as envelope detector 751 in FIG. 7, recovers the modulation envelope from the RF signal. Then a slicer, such as slicer 753 in FIG. 7, converts the modulation envelope to a digital signal, consisting of a digital "1" when the modulation envelope voltage is greater than a slicer threshold voltage, and a digital "0" when the modulation envelope voltage is less than a slicer threshold voltage. These digital output states may be interchanged in some implementations.

In some embodiments, the type of RF modulation used by an RFID tag chip is amplitude shift keying (ASK) modulation, in which the amplitude of the RF signal varies as a function of time. Because the absolute RF signal amplitude can vary substantially as a function of reader transmit power, the reader and tag antenna gains, and the distance between the tag and reader, the digital information represented by the modulated RF signal is typically not dependent on the absolute RF amplitude or field strength. Instead the digital information is typically dependent on the relative amplitude shift between the modulated and unmodulated RF signal amplitudes.

Figure 16A:
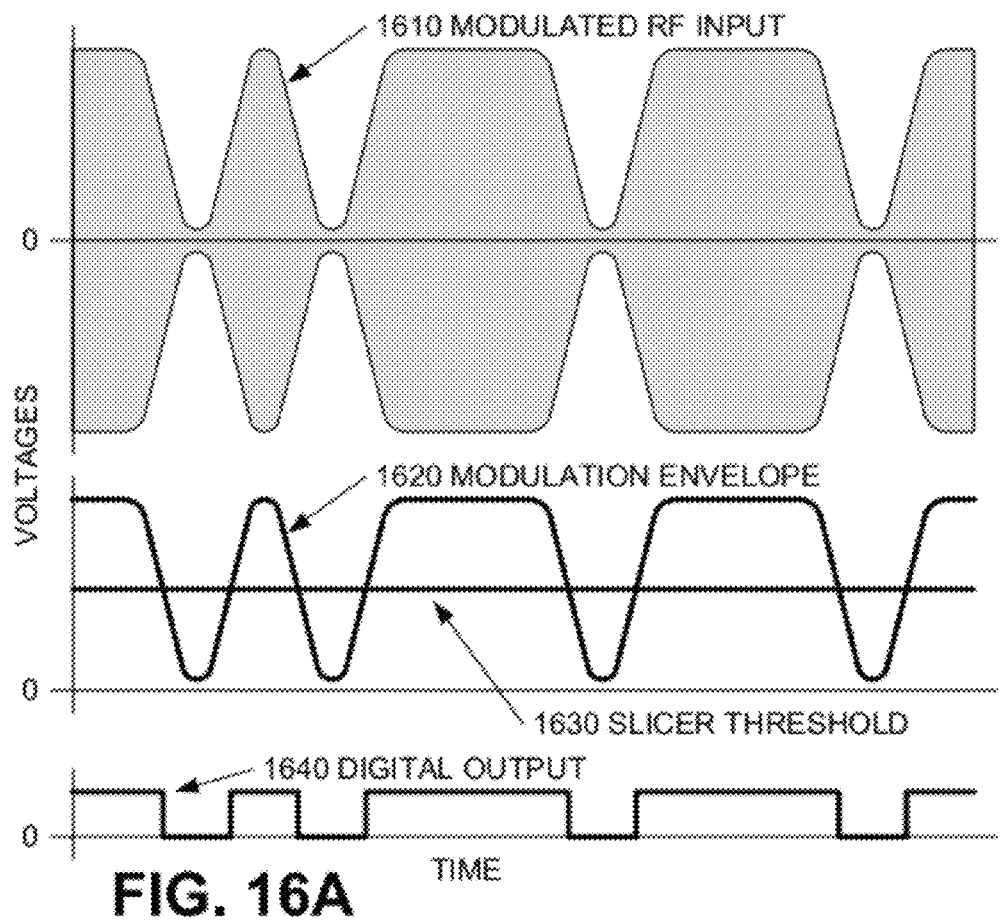
FIGS. 16A and 16B illustrate example demodulator signal waveforms.
Figure 16B:
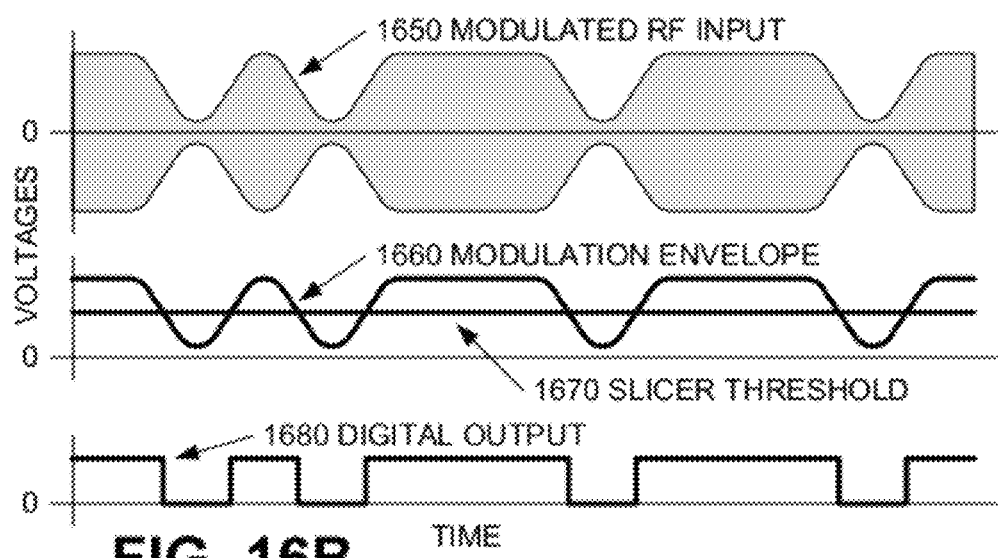

FIG. 16A and FIG. 16B illustrate the demodulator signal waveforms discussed in the previous paragraphs, for high and low amplitude RF inputs respectively. The waveforms are plotted as voltage on the Y axis, as a function of time on the X axis. Waveforms 1610 and 1650 are modulated RF inputs with high and low amplitudes respectively. Waveforms 1620 and 1660 are modulation envelope signals recovered by an envelope detector from RF input waveforms 1610 and 1650. These modulation envelope signals retain both the absolute and relative RF amplitude information contained in the RF waveforms 1610 and 1650. Waveforms 1630 and 1670 are the slicer threshold voltages corresponding to modulation envelopes 1620 and 1660. In a typical slicer implementation, the slicer reference may be derived from the modulation envelope by a peak detector, which generates the maximum (peak) value of the modulation envelope, followed by either a fixed offset voltage or an attenuator. In this way, the slicer threshold voltage is adapted to the absolute amplitude of the modulation envelope, whether it is high or low. Waveforms 1640 and 1680 are the slicer digital output waveforms, which are typically generated by comparing the modulation envelope to the slicer threshold voltage as described above. Because the slicer threshold voltage is adapted to the absolute amplitude of the modulation envelope signal, the digital output waveforms 1640 and 1680 are identical even though the corresponding modulated RF input waveforms 1610 and 1650, respectively, have substantially different amplitudes. The digital information contained in the slicer digital output waveform may be encoded, in which case additional processing, typically digital, may be required to recover it. For example, the digital information may be pulse-interval encoded (PIE), with a long interval between pulses corresponding to a digital "1" and a short interval to a digital "0". Other encoding methods include pulse-width encoding, state transition encoding, or multi-bit symbol encoding.

Returning to FIG. 7, the example RFID tag chip of FIG. 6B is illustrated as tag chip 750 showing components of the differential demodulators. Differential demodulators 652 and 654 of tag chip 750 may each include differential envelope detectors 751, 755 and slicers 753, 757. Differential envelope detectors 751 and 755 may each receive differential RF inputs (RF1_P/RF1_N) and (RF2_P/RF2_N), respectively, from antenna connections (ANT1_P/ANT1_N) and (ANT2_P/ANT2_N). The differential envelope detectors may then perform envelope detection and provide the recovered modulation envelope signals ENVOUT1 and ENVOUT2 to respective slicers 753 and 757. The slicers receive these envelope signals as analog inputs AIN1 and AIN2, and convert them to digital output signals, at output ports DOUT1 and DOUT2, which are provided to other tag circuits 656 as discussed above.

Figure 8:
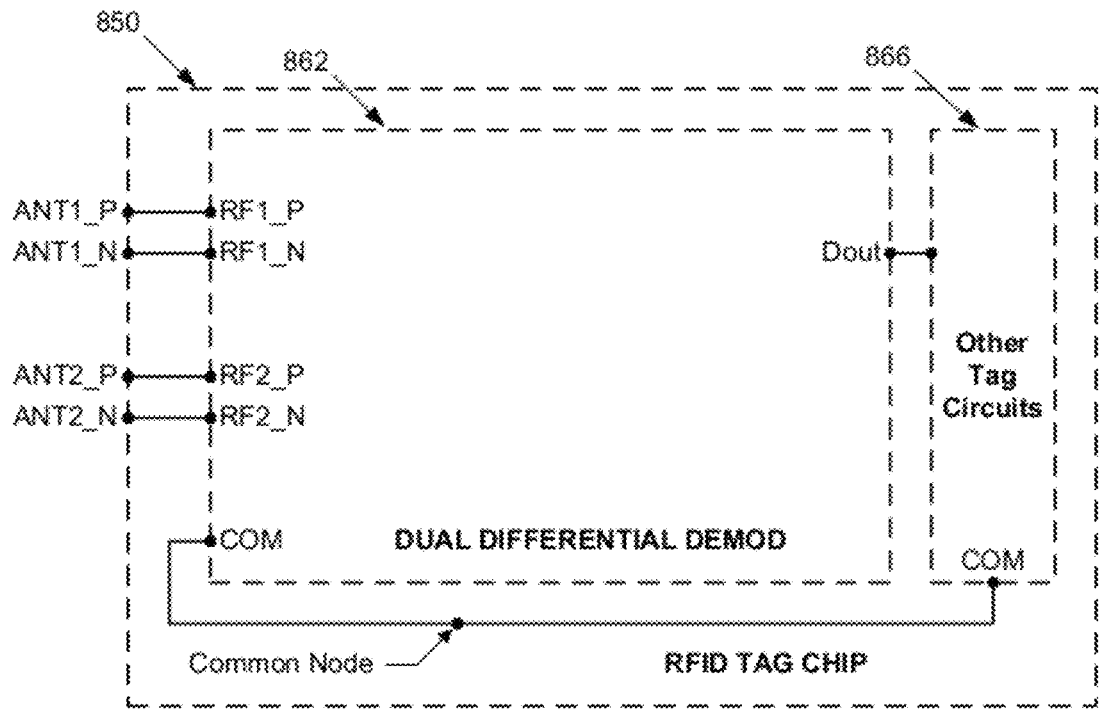
FIG. 8 illustrates another example RFID tag chip with one dual-differential demodulator according to embodiments.

FIG. 8 illustrates another example RFID tag chip 850 with one dual-differential demodulator according to embodiments. A tag chip is referred to as dual when it processes two RF input ports. A tag chip is referred to as dual-differential when it processes two differential RF input ports. The dual-differential demodulator 862 includes two differential RF input ports (RF1_P/RF1_N) and (RF2_P/RF2_N) receiving differential RF signals, respectively, from antenna connections (ANT1_P/ANT1_N) and (ANT2_P/ANT2_N). Dual-differential demodulator 862 provides a single digital output signal, at output port DOUT, to other tag circuits 866, such as processing block 444.

Figure 9:
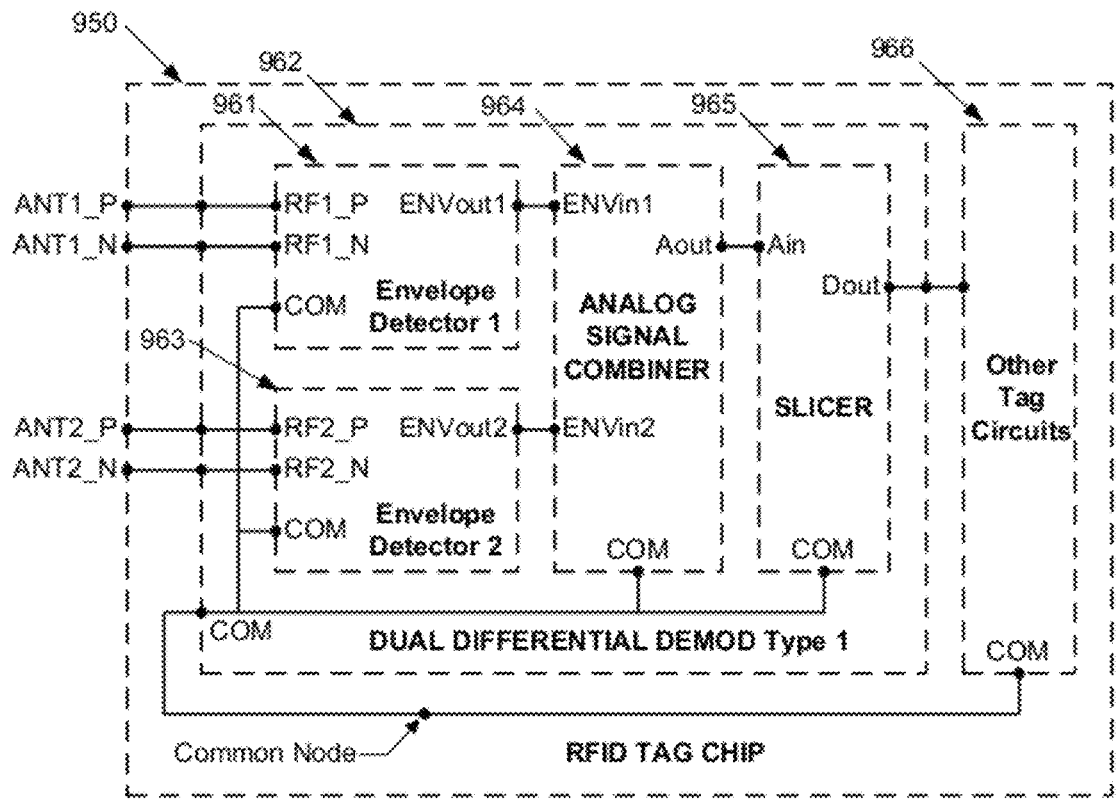
FIG. 9 illustrates the example RFID tag chip of FIG. 8 with components of the demodulator including an analog signal combiner according to one embodiment.

FIG. 9 illustrates the example RFID tag chip of FIG. 8 with components of the demodulator according to one embodiment including an analog signal combiner. As mentioned previously, recovered analog modulation envelope signals may be first combined and then converted to a digital signal, or first converted to a digital signal and then combined, in a dual-differential demodulator according to embodiments. Dual-differential demodulator 962 of tag chip 950 is an example of the former configuration.

Differential envelope detectors 961 and 963 may receive differential RF inputs (RF1_P/RF1_N) and (RF2_P/RF2_N), respectively, from antenna connections (ANT1_P/ANT1_N) and (ANT2_P/ANT2_N). The envelope detectors may then perform envelope detection and provide the recovered modulation envelope signals ENVOUT1 and ENVOUT2 to analog signal combiner 964. Analog signal combiner 964 receives these envelope signals as input signals ENVIN1 and ENVIN2, respectively, combines the signals, and provides analog output signal AOUT to slicer 965. Slicer 965 receives the analog signal as AIN, and converts it to a digital output signal, at output port DOUT, which is provided to other tag circuits 966, such as processing block 444.

Figure 10:
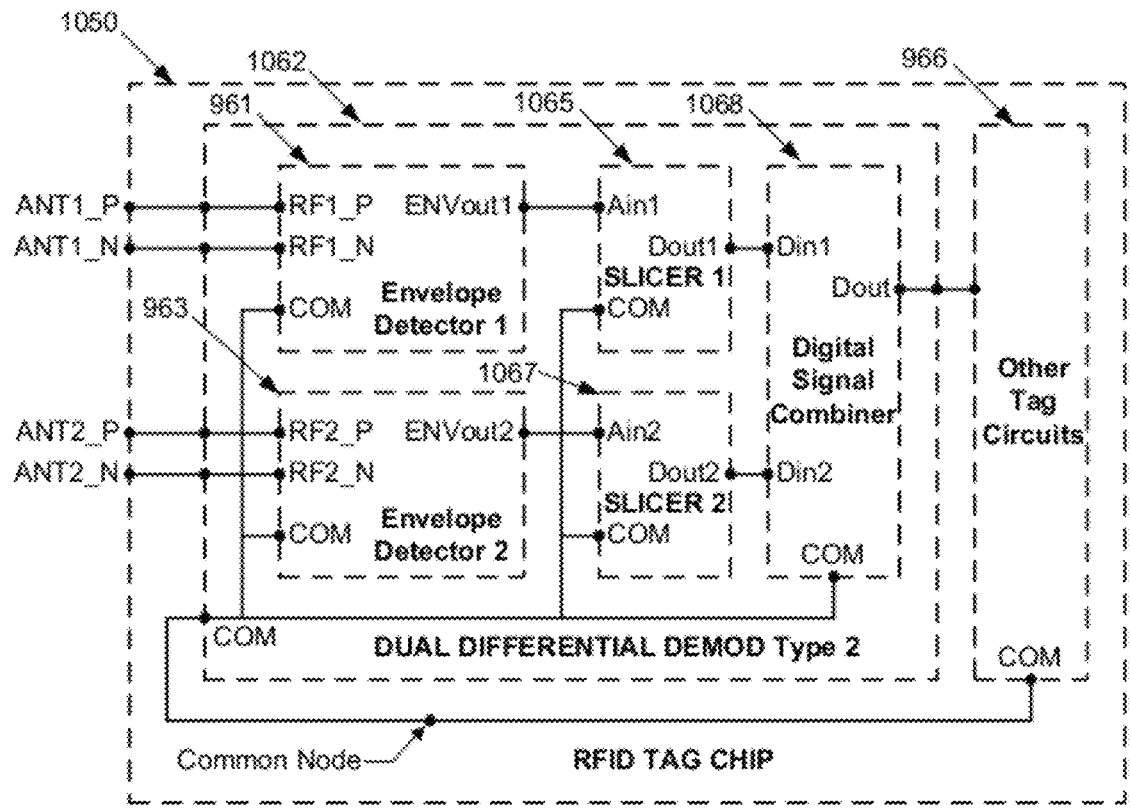
FIG. 10 illustrates the example RFID tag chip of FIG. 8 with components of the demodulator including a digital signal combiner according to another embodiment.

FIG. 10 illustrates the example RFID tag chip of FIG. 8 with demodulator components, including a digital signal combiner, according to another embodiment. Differential envelope detectors 961 and 963 of dual-differential demodulator 1062 in tag chip 1050 may receive differential RF inputs (RF1_P/RF1_N) and (RF2_P/RF2_N), respectively, from antenna connections (ANT1_P/ANT1_N) and (ANT2_P/ANT2_N). The differential envelope detectors may then perform envelope detection and provide the recovered modulation envelope signals ENVOUT1 and ENVOUT2 to respective slicers 1065 and 1067. The slicers receive the analog modulation envelope signals as input signals AIN1 and AIN2, and convert them to digital output signals DOUT1 and DOUT2, which are provided to digital signal combiner 1068. Digital signal combiner 1068 receives these signals as DIN1 and DIN2, combines them, and provides a combined digital output signal, at output port DOUT, to other tag circuits 966, such as processing block 444.

The envelope detectors, signal combiners, and slicers discussed above may be implemented in various ways. There are many ways to implement a dual-differential demodulator, some example implementations of which are described below for illustration purposes only. These example implementations and configurations are not intended to constitute limitations on embodiments. A dual-differential demodulator may be implemented in other ways as well using the principles described herein.

FIGS. 11A through 11D illustrate example implementations of differential Dickson-type envelope detectors that may be used in a differential demodulator according to embodiments. As described above, two differential demodulators can form a dual-differential demodulator. The two demodulators may be of the same type or may be different types, and may use the same or different envelope detectors.

Figure 11A:
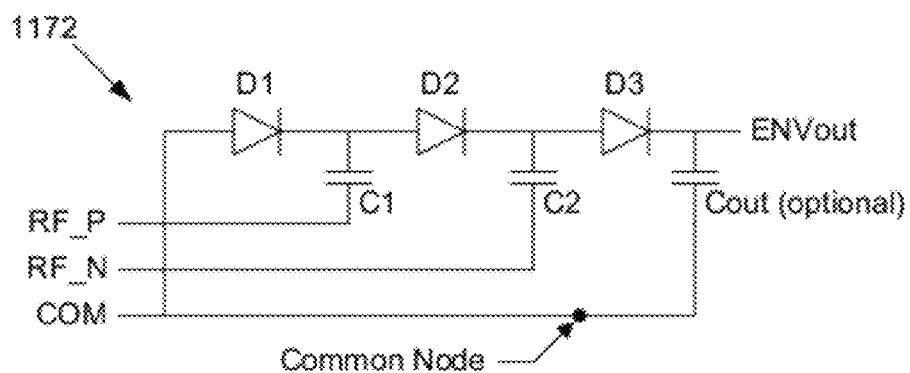
FIGS. 11A through 11D illustrate example implementations of differential Dickson-type envelope detectors that may be used in a dual-differential demodulator according to embodiments.

Envelope detector 1172 in FIG. 11A illustrates a single stage of a differential Dickson charge-pump envelope detector. This single stage comprises diodes D1, D2, and D3, and capacitors C1, C2, and COUT. The anode of diode D1 is coupled to the common node, which in some implementations may be ground or may be the semiconductor substrate. Differential RF input signal (RF_P and RF_N) are coupled to capacitors C1 and C2. A charge-pump envelope detector may, but is not required to, comprise multiple stages of the form shown in FIG. 11A, in which the diode D1 anode of each additional stage is connected to the output of the previous stage instead of to the common node. Output capacitor COUT is optional. Diodes D1, D2, and D3 may be any rectifying element including but not limited to junction diodes, Schottky diodes, diode-connected transistors, NMOS diodes, PMOS diodes, and NMOS/PMOS diode pairs. Input capacitors C1 and C2 may any capacitive element including but not limited to parallel-plate capacitors, fringe capacitors, and MOS capacitors. Example envelope detector 1172 has single-ended output ENVOUT.

Figure 11B:
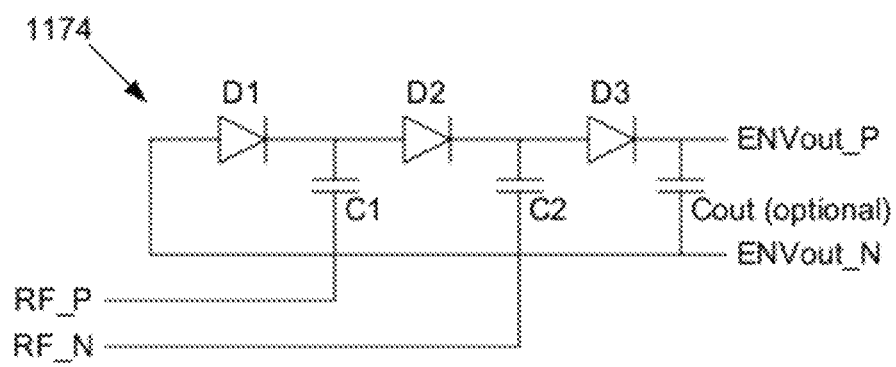

Example envelope detector 1174 of FIG. 11B is similar in construction to envelope detector 1172, but has differential outputs ENVOUT_P and ENVOUT_N. A differential envelope output may be required for some analog combiner implementations. In a multiple stage differential Dickson charge-pump envelope detector with differential outputs, the diode D1 anode of each additional stage is connected to the output of the previous stage, ENVOUT_N is connected to the diode D1 anode of the first stage, and ENVOUT_P is connected to the diode D3 cathode of the last stage.

Figure 11C:
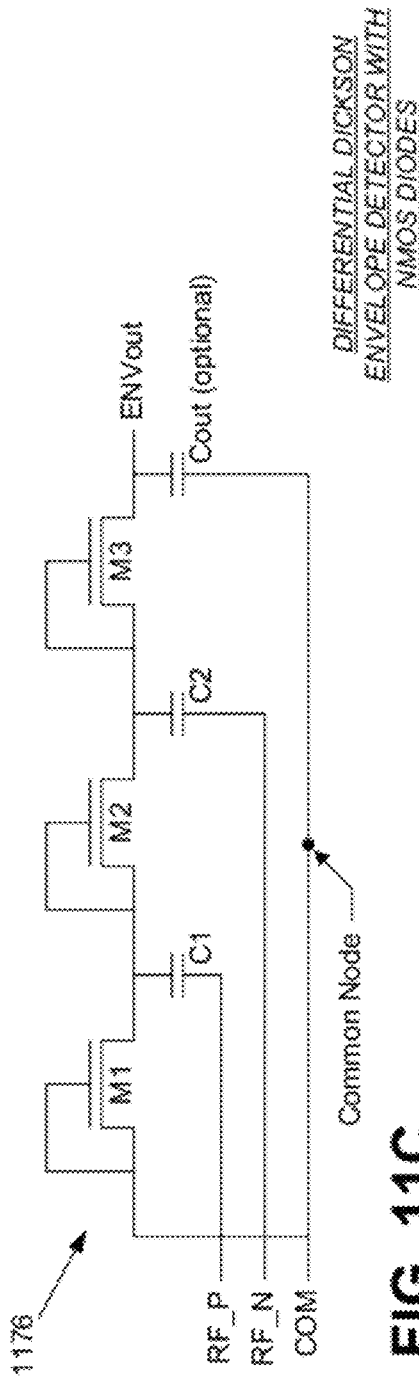

Envelope detector 1176 of FIG. 11C is a Dickson-type charge-pump envelope detector very similar to detector 1172 of FIG. 11A, highlighting that the diodes in FIG. 11A can be formed from diode-connected MOS transistors, in this case using NMOS transistors M1, M2, and M3.

Figure 11D:
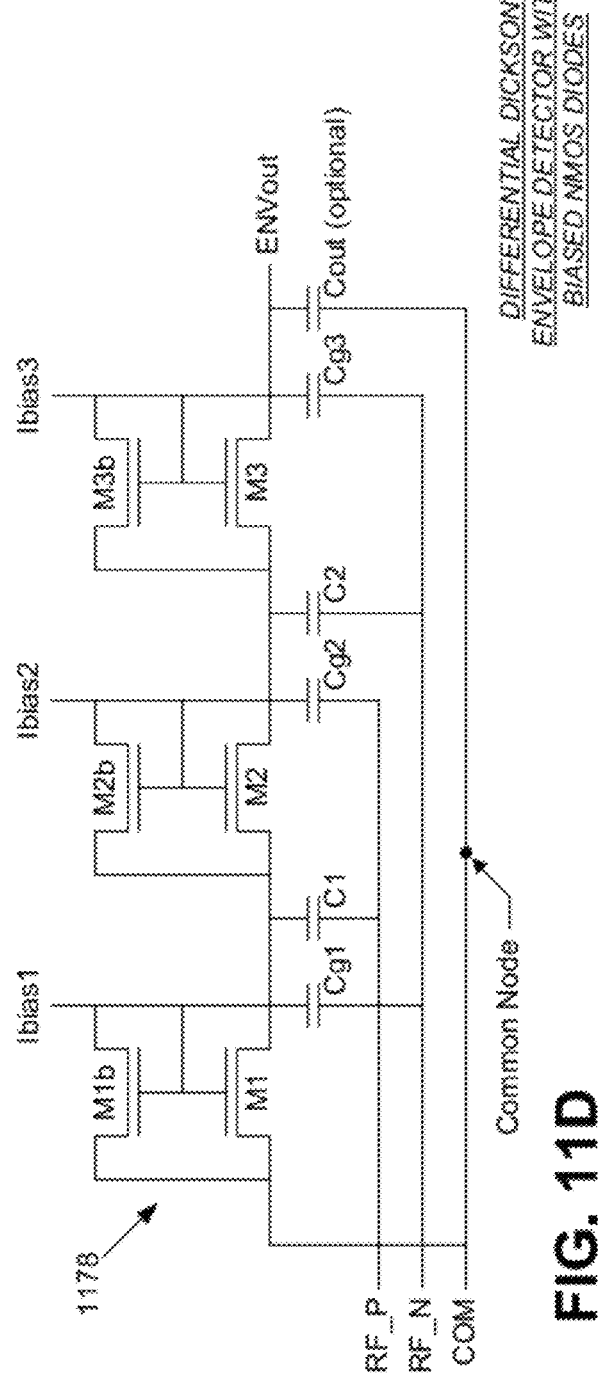

Envelope detector 1178 of FIG. 11D is yet another Dickson-type charge-pump envelope detector that is similar to envelope detector 1176 of FIG. 11C, but biases the NMOS transistors M1, M2, and M3 to reduce their turn-on threshold to the differential RF input and thus increase the envelope-detector sensitivity. The biasing elements comprise transistors M1B, M2B, and M3B. The differential RF input signals RF_P and RF_N are applied through pump capacitors C1 and C2; and optionally through gate capacitors CG1, CG2, and CG3 to the NMOS gate nodes to increase the effective switching voltage. As in FIG. 11A, the envelope detector provides a single output signal ENVOUT. As described above, an envelope detector can be formed from one or more stages of the type shown in FIG. 11D. According to other embodiments, biased PMOS transistors may also be used in place of NMOS transistors. Also as above, output capacitor COUT is optional.

Figure 12A:
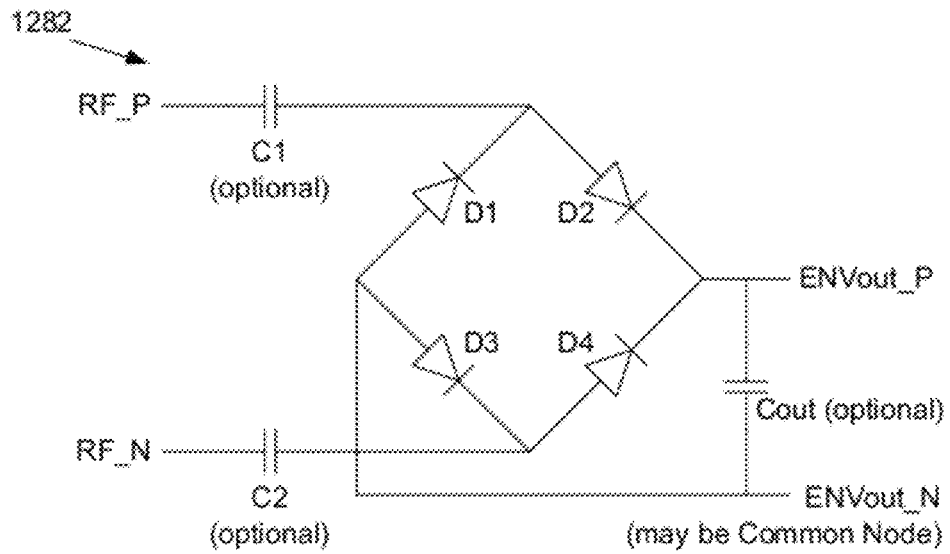
FIGS. 12A and 12B illustrate example implementations of differential bridge-type envelope detectors that may be used in a dual-differential demodulator according to embodiments.
Figure 12B:
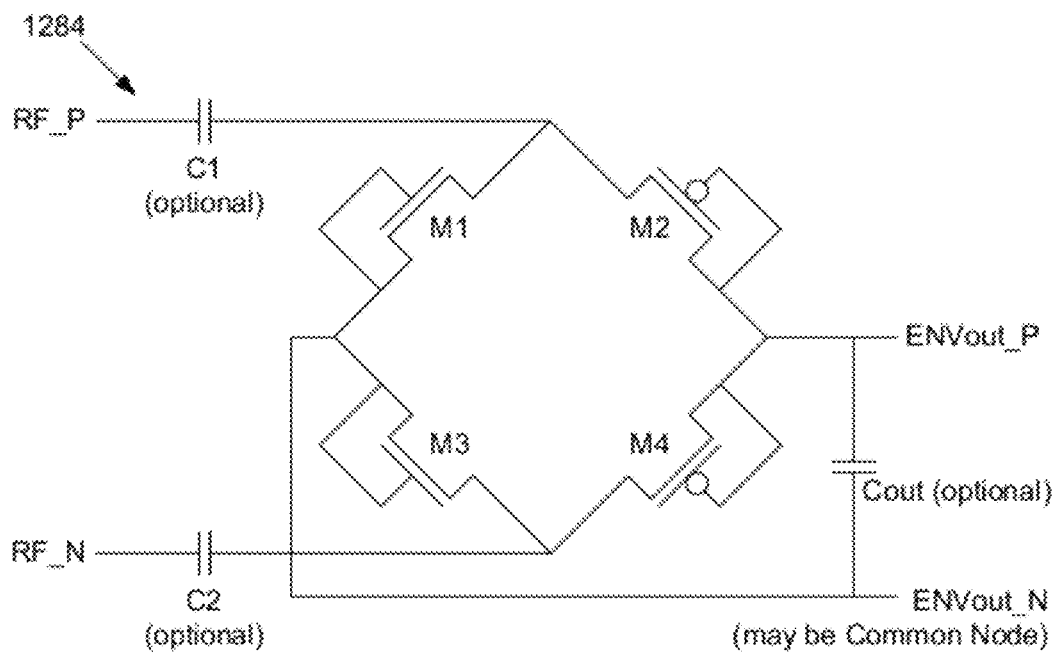

FIGS. 12A and 12B illustrate example implementations of differential bridge-type envelope detectors that may be used in a differential demodulator according to embodiments. As described above, two differential demodulators can form a dual-differential demodulator. The two demodulators may be of the same type or may be different types, and may use the same or different envelope detectors.

Envelope detector 1282 of FIG. 12A is a single stage of a differential bridge-type envelope detector comprising diodes D1, D2, D3, and D4, optional input capacitors C1 and C2, and optional output capacitor COUT. Differential RF input signal (RF_P and RF_N) may be provided through optional input capacitors C1 and C2. A bridge-type envelope detector may, but is not required to, comprise multiple stages of the form shown in FIG. 12A. Output capacitor COUT is optional. Diodes D1, D2, D3, and D4 may be any rectifying element including but not limited to junction diodes, Schottky diodes, and diode-connected transistors. Input capacitors C1 and C2 may any capacitive element including but not limited to parallel-plate capacitors, fringe capacitors, and MOS capacitors. Example envelope detector 1282 has differential outputs ENVOUT_P and ENVOUT_N, where ENVOUT_N may be connected to the common node.

Envelope detector 1284 of FIG. 12B is another example differential bridge-type envelope detector very similar to detector 1282 of FIG. 12A, highlighting that the diodes in FIG. 12A can be formed from diode-connected MOS transistors. In this particular embodiment M1 and M3 are NMOS devices whereas M2 and M4 are PMOS devices, but other configurations are possible. Envelope detector 1284 has differential outputs ENVOUT_P and ENVOUT_N. One of the outputs may be optionally connected to the common node if a single-ended output is desired.

FIGS. 13A through 13D illustrate example implementations of analog signal combiners that may be used in a dual demodulator according to embodiments. Although analog signal combiners are known in the art, examples are provided for illustration purposes. Embodiments may be implemented with any analog signal combiner, including the ones shown in FIG. 13.

Analog combiners allow combining the outputs from multiple envelope detectors, thereby allowing the use of a single slicer to digitize the detected and combined envelope signal. Relative to multiple slicers, a single slicer typically has the advantages of lower power consumption and lower area. Analog combiners may be active or passive, current-mode or voltage-mode, charge-mode or flux-mode.

Combiner 1392 of FIG. 13A is an example of a basic combining circuit that combines single-ended input signals IN1 and IN2 to form output signal OUT through a wiring node. This combiner is passive and may sum currents or charge, such as the outputs of two charge-pump envelope detectors.

Combiner 1394 of FIG. 13B is another example of a passive combining circuit that sums two differential inputs IN1 and IN2 to form a single-ended output OUT relative to the common node (COM), which may be connected to ground or to the semiconductor substrate. This combiner is passive and typically sums voltages.

Figure 13C:
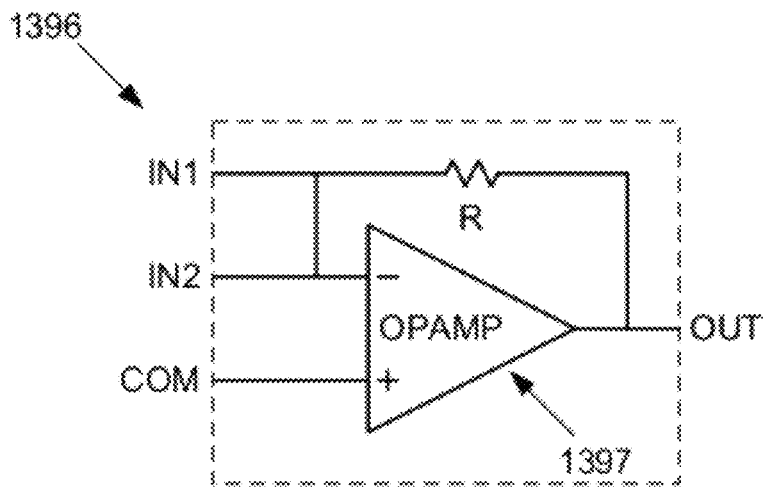

Combiner 1396 of FIG. 13C is an active, operational-amplifier-based active analog combiner. Operational amplifier 1397 forms a virtual ground at its inverting (−) input. This circuit configuration typically sums two input currents IN1 and IN2 and forms a voltage output whose value relative to the common node is given by −(IN1+IN2)×R.

Figure 13D:
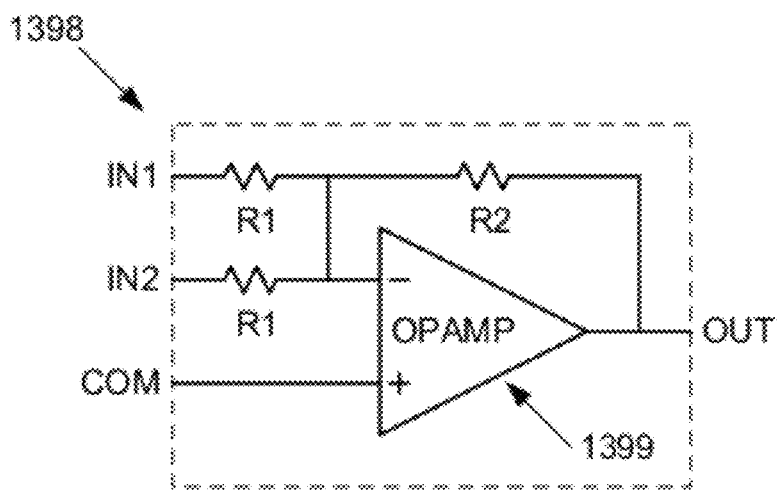

Combiner 1398 of FIG. 13D is another operational-amplifier-based active analog combiner Operational amplifier 1397 forms a virtual ground at its inverting (−) input. This circuit configuration typically sums two input voltages IN1 and 1N2 and forms a voltage output whose value relative to the common node is given by −(IN1+IN2)×(R2/R1).

Figure 14:
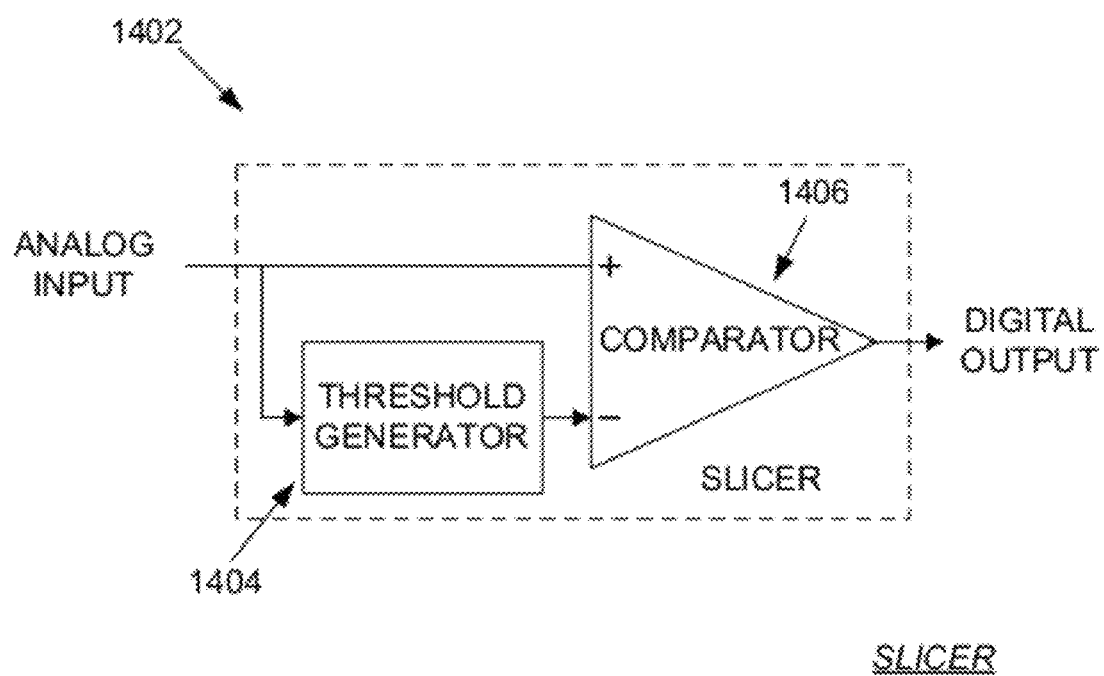
FIG. 14 illustrates an example implementation of a slicer that may be used in a dual-differential demodulator according to embodiments.

FIG. 14 illustrates an example implementation of a slicer that may be used in a demodulator according to embodiments. Slicer 1402 converts an analog envelope detector output to a digital signal. A typical implementation includes a threshold-generating circuit (threshold generator) 1404 and a comparator 1406. The threshold-generating circuit is typically configured to the type of analog signal being sliced. For example, analog signals without DC content (such as Manchester-encoded signals) may form their decision threshold using a low-pass filter as the threshold-generating circuit. As another example, signals with DC content (such as pulse-interval encoded signals) may form their decision threshold using a peak detector with a fixed offset or with an attenuator as the threshold-generating circuit. In some embodiments slicer 1402 may have multiple thresholds, may comprise multiple circuits, and may have multiple outputs. In some embodiments subsequent processing circuits may choose from among these multiple outputs, for example to choose a slicer output that gives the best rejection to RF interference.

FIGS. 15A through 15C illustrate example implementations of digital signal combiners that may be used in a dual demodulator according to embodiments. Although digital signal combiners are known in the art, examples are provided for illustration purposes. Embodiments may be implemented with any digital signal combiner, including the ones shown in FIG. 15.

Digital combiners can combine the outputs from two (or more) slicers. They may be implemented as a simple digital gate (e.g. OR, AND, MUX, etc.) or use a more complex digital function. They may also have optional control inputs.

Digital signal combiner 1512 of FIG. 15A is a logic OR gate that receives input signals IN1 and IN2 and provides output signal OUT. An OR gate combiner may be used when the default slicer digital output, in the absence of an RF input signal to the corresponding envelope detector, is a logic "0".

Digital signal combiner 1514 of FIG. 15B is a logic AND gate that receives input signals IN1 and IN2 and provides output signal OUT. An AND gate combiner may be used when the default slicer digital output, in the absence of an RF input signal to the corresponding envelope detector, is a logic "1".

Digital signal combiner 1516 of FIG. 15C represents the set of possible digital combining functions including digital filtering, processing, and logical operations. It may weight or otherwise bias its inputs. It may simply combine its inputs. It may instead operate on the inputs prior to combining, the outputs after combining, or both. It may adjust its operations with time, inputs, or via external command. It may be controlled through optional control inputs. It may be implemented using elementary digital circuits, as a Digital Signal Processor (DSP), as a microcontroller, or in any other type of logic circuitry as will be well known to those skilled in the art.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented (e.g. tags according to embodiments formed), individually and/or collectively, by a wide range of hardware, software, firmware, or virtually any combination thereof. Those skilled in the art will recognize that some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) tag circuit including:

a first demodulator having a first differential RF input port and a first output port, wherein the first differential RF input port is adapted to receive a first differential RF signal; and a second demodulator having a second RF input port and a second output port, wherein the first differential and second RF input ports do not share a common node.

2. The circuit of claim 1, wherein
the first differential and second RF input ports are electrically isolated from each other.

3. The circuit of claim 1, wherein
the second RF input port is a differential RF input port and is adapted to receive a second differential RF signal.

4. The circuit of claim 3, wherein
the first demodulator includes a first differential envelope detector for recovering a first modulation envelope from the first differential RF signal, and a first slicer for converting the recovered first modulation envelope to a first digital output signal, and
the second demodulator includes a second differential envelope detector for recovering a second modulation envelope from the second differential RF signal, and a second slicer for converting the recovered second modulation envelope to a second digital output signal.

5. The circuit of claim 4, wherein the first and second envelope detectors include one from a set of: a single-stage Dickson charge-pump envelope detector, a single stage bridge envelope detector, a multiple stage Dickson charge-pump envelope detector, and a multiple stage bridge envelope detector.

6. The circuit of claim 4, wherein the Dickson charge pump envelope detector includes one from a set of: junction diodes, Schottky diodes, diode-connected transistors, NMOS diodes, PMOS diodes, biased NMOS transistors, biased PMOS transistors, and NMOS/PMOS diode pairs.

7. The circuit of claim 4, wherein the first slicer includes a threshold-generator circuit for generating at least one threshold signal and a comparator circuit for generating the first digital output signal based on comparing the at least one threshold signal to the recovered first modulation envelope.

8. A Radio Frequency Identification (RFID) tag circuit including:
a dual-differential demodulator having a first and a second differential RF input ports and a digital output port, wherein the first and second differential RF input ports are adapted to receive first and second differential RF signals, respectively, and wherein the first and second differential RF input ports do not share a common node.

9. The circuit of claim 8, wherein
the first and second differential RF input ports are electrically isolated from each other.

10. The circuit of claim 8, wherein
the dual-differential demodulator includes a first envelope detector for recovering a first modulation envelope signal from the first differential RF signal and a second envelope detector for recovering a second modulation envelope signal from the second differential RF signal.

11. The circuit of claim 10, wherein the first and second envelope detectors include one from a set of: a single-stage Dickson charge-pump envelope detector, a single-stage bridge envelope detector, a multiple-stage Dickson charge-pump envelope detector, and a multiple-stage bridge envelope detector.

12. The circuit of claim 11, wherein the Dickson charge pump envelope detector includes one from a set of: junction diodes, Schottky diodes, diode-connected transistors, NMOS diodes, PMOS diodes, biased NMOS transistors, biased PMOS transistors, and NMOS/PMOS diode pairs.

13. The circuit of claim 10, further comprising:
an analog combiner adapted to receive the recovered first and second modulation envelope signals from the first and second envelope detectors and combine them into an analog signal; and
a slicer to convert the analog signal into a digital signal.

14. The circuit of claim 13, wherein the analog combiner is adapted to combine the recovered modulation envelope signals by coupling them together using one of: a passive current mode, a passive voltage mode, a passive charge mode, and a passive flux mode.

15. The circuit of claim 13, wherein the analog combiner is adapted to combine the recovered modulation envelope signals using one of: an active current-mode amplification circuit and an active voltage-mode amplification circuit.

16. The circuit of claim 10, further comprising:
a first slicer adapted to receive the first recovered modulation envelope signal and convert to a first digital signal;
a second slicer adapted to receive the second recovered modulation envelope signal and convert to a second digital signal; and
a digital combiner adapted to receive the first and second digital signals and combine them into a digital output signal.

17. The circuit of claim 16, wherein the digital combiner includes one from a set of: an OR gate, an AND gate, a multiplexer, a filter, a logic function, and a processing function.

18. A Radio Frequency Identification (RFID) tag, including:
at least one antenna; and
at least one differential demodulator coupled to the at least one antenna, wherein a first and a second RF input port of the at least one demodulator are adapted to receive first and second differential RF signals, respectively, and wherein the first and second differential RF input ports do not share a common node.

19. The RFID tag of claim 18, wherein
the first and second differential RF input ports are electrically isolated from each other.

20. The RFID tag of claim 18, wherein the at least one demodulator includes a differential envelope detector for each RF input port, the two differential envelope detectors configured to recover modulation envelope signals from the respective differential RF signals.

* * * * *